United States Patent
Blinov et al.

(10) Patent No.: US 12,301,121 B2
(45) Date of Patent: May 13, 2025

(54) SYSTEM AND METHOD FOR A PARTIAL POWER TRANSFER BETWEEN TWO DC SOURCES

(71) Applicant: TALLINN UNIVERSITY OF TECHNOLOGY, Tallinn (EE)

(72) Inventors: Andrei Blinov, Tallinn (EE); Andrii Chub, Tallinn (EE); Oleksandr Korkh, Tallinn (EE); Dmitri Vinnikov, Tallinn (EE); Ilja Galkins, Tallinn (EE); Dimosthenis Peftitsis, Tallinn (EE)

(73) Assignee: TALLINN UNIVERSITY OF TECHNOLOGY, Tallinn (EE)

( * ) Notice: Subject to any disclaimer, the term of this patent is extended or adjusted under 35 U.S.C. 154(b) by 19 days.

(21) Appl. No.: 18/267,193

(22) PCT Filed: Dec. 15, 2021

(86) PCT No.: PCT/IB2021/061734
§ 371 (c)(1),
(2) Date: Jun. 14, 2023

(87) PCT Pub. No.: WO2022/130221
PCT Pub. Date: Jun. 23, 2022

(65) Prior Publication Data
US 2024/0063723 A1 Feb. 22, 2024

(30) Foreign Application Priority Data
Dec. 15, 2020 (EE) .................................. P202000020

(51) Int. Cl.
*H02M 3/335* (2006.01)
*H02M 1/00* (2007.01)
(52) U.S. Cl.
CPC ..... *H02M 3/33584* (2013.01); *H02M 1/0048* (2021.05)

(58) Field of Classification Search
CPC ........................ H02M 1/0048; H02M 3/33584
(Continued)

(56) References Cited

U.S. PATENT DOCUMENTS

| 9,960,687 B2 | 5/2018 | Elasser et al. |
| 10,116,221 B2 | 10/2018 | Iwaya et al. |
| 2015/0229225 A1 * | 8/2015 | Jang ...................... H02M 3/285 363/17 |

FOREIGN PATENT DOCUMENTS

CN 110798074 A * 2/2020

OTHER PUBLICATIONS

International Search Report and Written Opinion in Application No. PCT/IB2021/061734, mailed Apr. 28, 2022, 12 pages.
(Continued)

*Primary Examiner* — Hal Kaplan
(74) *Attorney, Agent, or Firm* — Meunier Carlin & Curfman LLC

(57) ABSTRACT

System and method for power transfer between the two DC voltage sources comprises a first and a second DC voltage source and a DC-DC converter. The DC-DC converter includes a first bidirectional converter, an isolating transformer and a second bidirectional converter. The first bidirectional converter has a bridge circuit of variable configuration to increase the control range of the DC converter, the second pair of input/output pins being connected to the first winding of the isolating transformer via a series connected capacitor. According to the method, the voltage difference between the first and second DC voltage sources is determined, and according to the voltage difference value, the bridge configuration of the first bidirectional converter is changed between full-bridge and half-bridge.

4 Claims, 2 Drawing Sheets

(58) Field of Classification Search
USPC .......................................................... 307/52
See application file for complete search history.

(56) References Cited

OTHER PUBLICATIONS

Chen Guipeng et al: "Partial Power Processing Multi-Port DC-DC Converters", IECON 2020 the 46th Annual Conference of the IEEE Industrial Electronics Society, IEEE, Oct. 18, 2020 (Oct. 18, 2020), pp. 1406-1411.

Spiazzi, G. "Reduced redundant power processing concept A reexamination" (2016 IEEE 17th Workshop on Control and Modeling for Power Electronics (COMPEL), Trondheim, 2016, pp. 1-8, doi: 10.1109/COMPEL.20167556677).

Zientarski, J. R.R. et al., "Series-Connected Partial-Power Converters Applied to PY Systems: a Design Approach Based on Step-Up/Down Voltage Regulation Range" (IEEE Transactions on Power Electronics, vol. 33, No. 9, pp. 7622-7633, Sep. 2018, doi: 10.1109/TPEL.2017.2765928).

* cited by examiner

SYSTEM AND METHOD FOR A PARTIAL POWER TRANSFER BETWEEN TWO DC SOURCES

CROSS REFERENCES

This application is a U.S. national stage application of international patent application number PCT/IB2021/061734 filed on Dec. 15, 2021 and claiming priority to Estonian application P202000020 filed on Dec. 15, 2020.

TECHNICAL FIELD

The invention relates to the field of power semiconductor converters used in DC (Direct Current) transmission systems, and more particularly to bidirectional, soft-switching, DC-DC converters that transmit energy and regulate voltage between two DC voltage sources. Important applications of the invention include such DC power systems as DC power grids and fast charging systems for electric vehicles.

BACKGROUND ART

The use of multiple power sources in DC electrical systems and the emergence of electric cars at the energy market require DC-DC converter solutions that provide bidirectional power transmission.

In the case of a full-power bidirectional DC-DC converter, the converter is located between two DC-voltage sources, whereas the converter being usually based on a galvanically non-isolated buck-boost topology. Such converters provide high performance in terms of regulation, controllability and protection, but the reliability and cost may limit their widespread use in certain fields.

Partial power DC-DC converters are designed in such a way that the converter processes only part of the power flow and the rest is transmitted directly. To maximize the benefits of such converters, the amount of processed power (partiality ratio) should be minimized. Many different topologies have been proposed and analyzed for partial power converters, while the studies in the article G. Spiazzi, "Reduced redundant power processing concept: A reexamination" (2016 IEEE 17th Workshop on Control and Modeling for Power Electronics (COMPEL), Trondheim, 2016, pp. 1-8, doi: 10.1109/COMPEL.2016.7556677) show that only topologies with galvanic isolation can be useful in practical applications. Nevertheless, partial power converters should be designed with low partiality ratio, as such converters can show excellent cost-quality ratio in applications that do not require a wide range of voltage regulation. The wider range of voltage regulation and/or lower partiality ratio can be achieved with topologies, capable of both increasing and decreasing the voltage (buck and boost).

Article J. R. R. Zientarski, M. L. d. S. Martins, J. R. Pinheiro and H. L. Hey, "Series-Connected Partial-Power Converters Applied to PV Systems: A Design Approach Based on Step-Up/Down Voltage Regulation Range" (IEEE Transactions on Power Electronics, vol. 33, no. 9, pp. 7622-7633, September 2018, doi: 10.1109/TPEL.2017.2765928) describes a single-stage unidirectional buck-boost DC-DC partial power converter.

In general, a bidirectional buck-boost DC-DC converter can be based on a single-stage isolated matrix converter topology. The topologies disclosed in U.S. Pat. No. 9,960,687B2 and U.S. Ser. No. 10/116,221B2 are generally based on a DC-AC stage, a high-frequency isolating transformer and an AC-DC stage that is based on bidirectional voltage-blocking switches.

The solution that is the closest and the most similar to the invention in terms of technical results is described in U.S. Pat. No. 10,116,221B2. The voltage compensation system consists of a first and a second DC voltage source with negative terminals connected to each other and a DC-DC converter, which comprises a primary bidirectional converter, consisting of similar semiconductor switches and having a first pair and a second pair of input and output terminals, whereas the primary bidirectional converter is being connected to the first DC voltage source via a first pair of input and output terminals, a multi-winding isolating transformer and a secondary bidirectional converter consisting of similar bi-directional voltage blocking semiconductor switches and a partial power capacitor having a first pair and a second pair of input and output terminals, whereas the first pair of input and output pins of the secondary bidirectional converter is connected to the secondary winding of the isolating transformer and the second pair of input and output terminals is connected between the positive terminals of the first and second DC voltage sources.

The above written solution describes different topologies of DC-DC converters, each of which is used as a separate unit to increase or decrease the output voltage of the converter. In a wide range of partial power operation, a large part of the first DC voltage source voltage is applied to transformer primary winding, which increases the load of semiconductor switches and the switching losses, thus reducing the system efficiency and the fault tolerance of the used semiconductor switches.

DISCLOSURE OF THE INVENTION

The object of the invention is to provide a system and method for transferring power between two DC voltage sources, which makes it possible to optimize the operation of the DC-DC converter in the system over a wide range of voltage regulation.

The system according to the invention consists of a first and a second DC voltage source, the negative terminals of which are connected to each other, and a DC-DC converter formed by a primary bidirectional converter consisting of similar semiconductor switches, a secondary bidirectional converter consisting of similar bi-directional voltage blocking semiconductor switches and a partial power capacitor, which has a first and a second pair of input and output terminals, and a isolating transformer, whereas the primary bidirectional converter is connected to the first DC voltage source via the first pair of input and output terminals, the first pair of input and output terminals of the secondary bidirectional converter is connected to the secondary winding of the isolating transformer and the second pair of input and output terminals of the secondary bidirectional converter is connected between the positive terminals of the first and second DC voltage sources, wherein the invention goal in comparison with the known solution is obtained by the primary bidirectional converter of the DC-DC converter having a bridge circuit with a variable configuration for increasing the voltage adjustment range of the DC-DC converter, with a second pair of input and output terminals connected to the primary winding of the isolating transformer via series capacitor.

Preferably, the primary bidirectional converter has a full bridge or an asymmetric half bridge topology.

The capacitance of the series capacitor is chosen such, that at the switching frequency of the primary bidirectional converter there is no resonance.

According to the method of the invention, the voltage difference between the primary and secondary DC voltage sources is determined, and according to the obtained value of the voltage difference, the configuration of the primary bidirectional converter bridge circuit is changed between the full-bridge and the asymmetrical half bridge to increase the control range.

BRIEF DESCRIPTION OF DRAWINGS

The invention will now be described by the means of example, with reference to the accompanying drawings.

DETAILED DESCRIPTION OF THE EMBODIMENT

An example of the implementation of a power transmission system between two DC voltage sources is explained below with reference to the figures.

Figure 1:
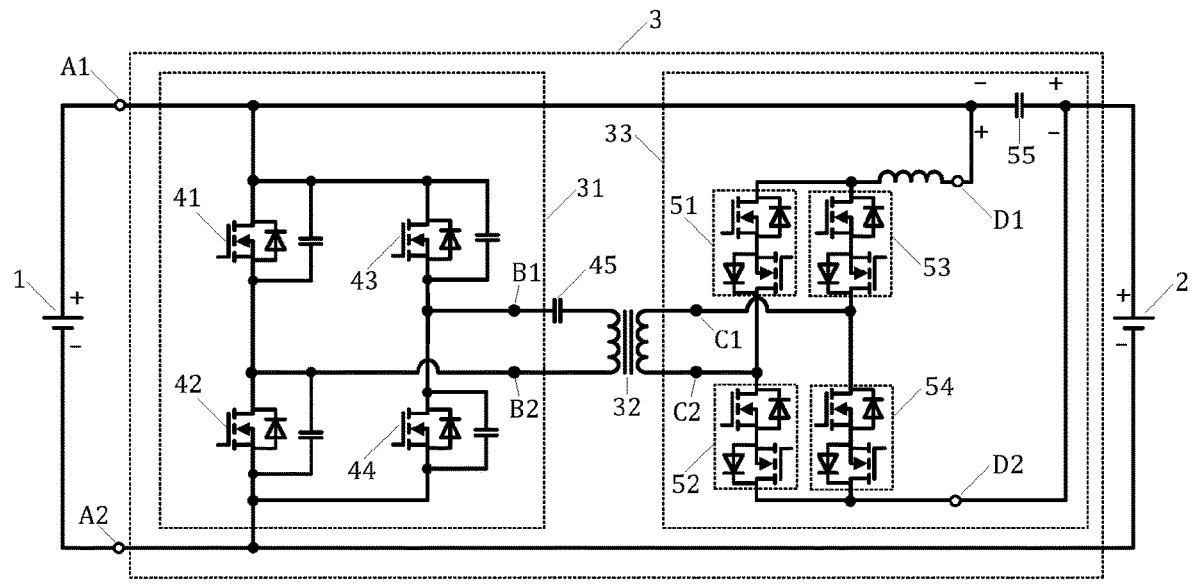
FIG. 1 shows a system for transmitting power between two DC voltage sources in a full-bridge topology of a primary bidirectional converter.

FIG. 1 illustrates a system for transmitting power between two DC voltage sources in a full bridge circuit of a primary bidirectional converter. The system for transmitting power between the two DC voltage sources consists of a first DC voltage source 1, a second DC voltage source 2 and a DC-DC converter 3. The negative terminals of the first DC voltage source 1 and the second DC voltage source 2 are connected to each other. The DC voltage converter 3 comprises a primary bidirectional converter 31, a multi-winding isolating transformer 32 and a secondary bidirectional converter 33. The primary bidirectional converter 31 consists of similar controllable semiconductor switches 41, 42, 43, 44. The primary bidirectional converter 31 is connected to the first DC voltage source 1 via a first pair of input and output terminals A1, A2.

The second pair of input and output pins B1, B2 of the primary bidirectional converter 31 is connected to the primary winding of the isolating transformer 32 via a series capacitor 45.

The capacitance of the series capacitor 45 is selected such that at the switching frequency of the primary bidirectional converter 31 there is no resonance. In the case of a full bridge connection of the primary bidirectional converter 31, the series capacitor 45 prevents the DC component from reaching the isolating transformer 32. The secondary bidirectional converter 33 consists of similar semiconductor switches 51, 52, 53, 54 with bidirectional voltage blocking capability and a partial power capacitor 55. The first pair of input and output pins C1, C2 of the secondary bidirectional converter 33 is connected to the secondary winding of the isolating transformer 32 and the second pair of input and output pins D1, D2 are connected between the positive terminals of the first DC voltage source 1 and the second DC voltage source 2.

Figure 2:
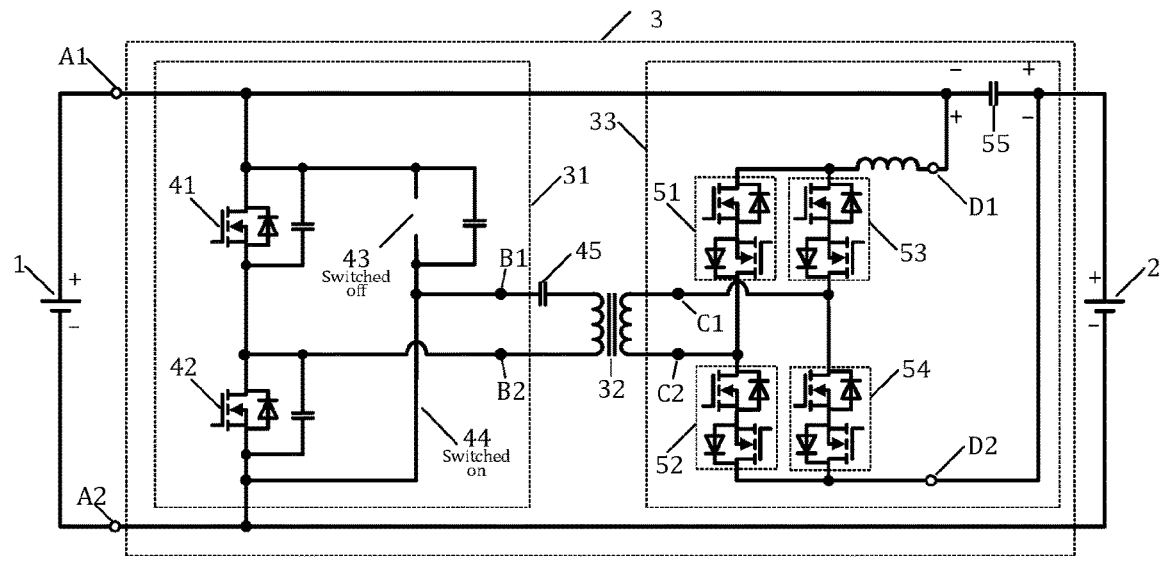
FIG. 2 shows a system for transmitting power between two DC voltage sources in an asymmetrical half-bridge topology of a primary bidirectional converter.

The DC converter 3 is switched on in the full-bridge configuration of the primary bidirectional converter 31. The opposite legs of the bridge are switched on and off alternately, by the pairs (41, 44 and 42, 43) of the semiconductor switches 41, 42, 43 and 44. Semiconductor switches are commutated with a duty cycle of less than 0.5. FIGS. 1 and 2 show MOSFETs as semiconductor switches, but thyristors or IGBT transistors can also be used. The primary bidirectional converter 31 is controlled by the means of pulses or pulse width control (PWM). The primary bidirectional converter 31 is an inverter whose voltage is applied to the primary winding of the isolating transformer 32. The alternating voltage generated from the full voltage of first DC voltage source 1 is applied to the isolating transformer 32 in the full-bridge configuration. The isolating transformer 32 reduces this voltage for the secondary bidirectional converter 33 in proportion to the transformer turns ratio. In the secondary bidirectional converter 33, the alternating voltage of the transformer secondary winding is processed by alternately switching on and off the pairs of semiconductor switches 51, 52, 53, 54 to the obtain the voltage level, required by the partial power capacitor 55. The semiconductor switches of both bidirectional converters 31 and 33 are controlled by a control device not shown in the figure.

FIG. 2 depicts a system for transmitting power between two DC voltage sources in an asymmetrical half-bridge circuit of a primary bidirectional converter. This circuit is generated by a control device (not shown) if the voltage difference between the two DC voltage sources 1, 2, i.e. the value of the compensation voltage at the partial power capacitor 55, is less than one half of the maximum voltage of the partial power capacitor 55. In this operation, one of the controllable semiconductor switches is open (for example 44), while the other controllable semiconductor switch 43 of the same leg is closed. Semiconductor switches 41 and 42 are commutated with a duty-cycle of less than 0.5. Due to the series capacitor 45, half of the voltage obtained from the first DC voltage source 1 is now applied to the primary winding of the isolation transformer 32. The asymmetrical half-bridge topology improves the operation of the isolating transformer 32, the voltage of the secondary bidirectional converter 33 is lower, thus the adjustment range of the DC-voltage converter 3 increases, the voltage applied to the semiconductor switches is lower and their switching losses are lower. The asymmetrical half-bridge circuit can also be used in the event of a failure of one of the transistors in the primary bidirectional converter.

Figure 3:
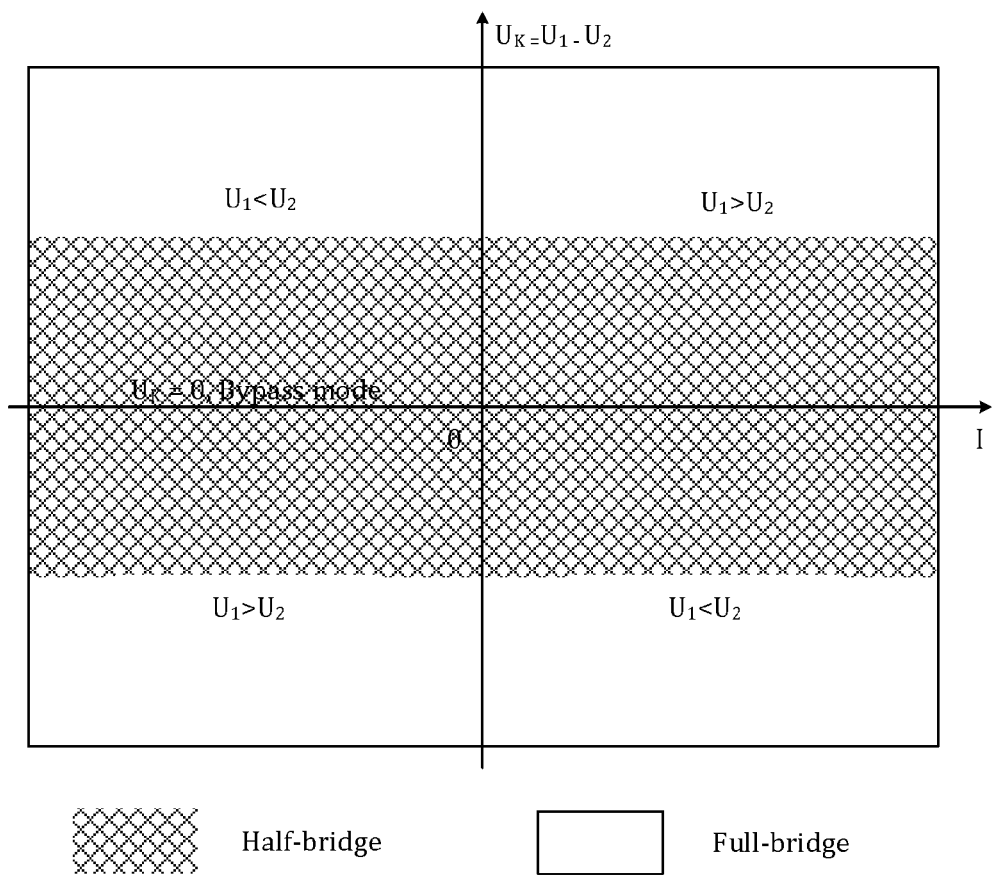
FIG. 3 shows the power transfer between two DC voltage sources in different operating modes.

FIG. 3 shows the power transfer between two DC voltage sources in different operating modes. Four-quadrant DC-DC converter has variable current direction and bipolar adjustable voltage. In the first quadrant, the voltage $U_1$ of the first DC voltage source is greater than the voltage $U_2$ of the second DC voltage source, the compensation voltage $U_k$ of the partial power capacitor and the output current I of the DC-DC converter are in the same direction. In the fourth quadrant, the voltage $U_2$ of the second DC voltage source is greater than the voltage $U_1$ of the first DC voltage source. Here, the direction of the output current I is the same, but the direction of the compensation voltage $U_k$ is the opposite. In the first and fourth quadrants, the system transfers power from the first DC voltage source to the second DC voltage source.

In the second quadrant, the voltage $U_2$ of the second DC voltage source is greater than the voltage $U_1$ of the first DC voltage source, and in the third quadrant, the voltage $U_1$ of the first DC voltage source is greater than the voltage $U_2$ of the second DC voltage source. In the second and third quadrants, the system transfers power from the second DC voltage source to the first DC voltage source.

If the value of the compensation voltage $U_k$ on the partial power capacitor due to the difference between the voltages of the first and second DC voltage sources is less than half of the maximum voltage value on the partial power capacitor (dashed area in the figure), then the primary bidirectional converter operates as an asymmetrical half-bridge circuit. At higher voltages, the full bridge circuit of the primary bidirectional converter is used. If the compensation voltage $U_k$ is zero, the DC converter operates in bypass mode, i.e. the DC converter does not process power.

The invention claimed is:

1. A system for transmitting power between two DC voltage sources comprising a first and a second DC voltage source having negative terminals connected to each other and a DC converter comprising a primary bidirectional converter with semiconductor switches and having a first pair and a second pair of input and output terminals, wherein,
   the primary bidirectional converter is connected to the first DC voltage source via the first pair of input and output terminals, a multi-winding isolating transformer, and
   a secondary bidirectional converter comprising semiconductor switches with a bidirectional voltage blocking capability and a partial power capacitor and having a first pair and a second pair of input and output terminals, wherein the first pair of input and output terminals of the secondary bidirectional converter being connected to a secondary winding of the isolating transformer and the second pair of input and output terminals is connected between positive terminals of the first and the second DC voltage source, and wherein the primary bidirectional converter has a bridge circuit with a variable configuration to increase an adjustment range of the DC converter, which has the second pair of input and output terminals being connected via a series capacitor to the first winding of the isolating transformer, wherein the primary bidirectional converter has an asymmetrical half-bridge topology.

2. The system according to claim 1, wherein the primary bidirectional converter is switched between the asymmetrical half-bridge topology and a full-bridge topology.

3. The system according to claim 1, wherein a capacitance of the series capacitor is selected such that there is no resonance at a switching frequency of the primary bidirectional converter.

4. A method for transmitting power between two DC voltage sources with a system comprising a first and a second DC voltage source having negative terminals connected together and a DC converter comprising a primary bidirectional converter with semiconductor switches and having a first pair and a second pair of input and output terminals, wherein the primary bidirectional converter is connected to the first DC voltage source via the first pair of input and output terminals, a multi-winding isolating transformer and a secondary bidirectional converter with semiconductor switches with a bidirectional voltage blocking capability and a partial power capacitor which has a first pair and a second pair of input and output terminals, the first pair of input and output terminals of the secondary bidirectional converter being connected to a secondary winding of the isolating transformer and the second pair of input and output terminals, that are connected between positive terminals of the first and second DC voltage sources wherein the method comprises:
   measuring a voltage difference between the first and the second DC voltage sources, and
   changing topology of the primary bidirectional converter between a full-bridge and an asymmetrical half-bridge, according to an acquired voltage difference value, in order to increase an adjustment range of the DC converter.

* * * * *